United States Patent
Zhang

(10) Patent No.: US 12,062,980 B2
(45) Date of Patent: Aug. 13, 2024

(54) DC-DC CONVERTER CIRCUIT

(71) Applicant: TEXAS INSTRUMENTS INCORPORATED, Dallas, TX (US)

(72) Inventor: Liang Zhang, Beijing (CN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 183 days.

(21) Appl. No.: 17/491,366

(22) Filed: Sep. 30, 2021

(65) Prior Publication Data

US 2023/0103263 A1 Mar. 30, 2023

(51) Int. Cl.
*H02M 3/158* (2006.01)
*H02M 1/08* (2006.01)

(52) U.S. Cl.
CPC ............. *H02M 3/158* (2013.01); *H02M 1/08* (2013.01)

(58) Field of Classification Search
CPC ...... H02M 3/158; H02M 1/08; H02M 1/0022; H02M 1/15
See application file for complete search history.

(56) References Cited

U.S. PATENT DOCUMENTS

| | | | | |
|---|---|---|---|---|
| 4,720,670 | A | * | 1/1988 | Boyle .................... G01R 31/30 326/16 |
| 6,188,211 | B1 | | 2/2001 | Rincon-Mora et al. |
| 8,115,463 | B2 | | 2/2012 | Wang |
| 2008/0030178 | A1 | * | 2/2008 | Leonard ............... H02M 3/156 323/282 |
| 2014/0239928 | A1 | * | 8/2014 | Taniguchi ................ G05F 1/56 323/273 |
| 2015/0162830 | A1 | | 6/2015 | Dong et al. |
| 2017/0126329 | A1 | | 5/2017 | Gorecki et al. |

OTHER PUBLICATIONS

International PCT Search Report dated Jan. 18, 2023.

* cited by examiner

*Primary Examiner* — Jue Zhang
*Assistant Examiner* — Afework S Demisse
(74) *Attorney, Agent, or Firm* — Charles F. Koch; Frank D. Cimino

(57) ABSTRACT

A power supply circuit includes a power input, a power output, an error amplifier, a first transistor, and a second transistor. The error amplifier includes an output. The first transistor is coupled to the power input and the power output, and is configured to pass a current from the power input to the power output. The second transistor is coupled to the power input, the output of the error amplifier, and the first transistor, and is configured to provide, to the first transistor, a control voltage that is no less than a first voltage at the power input responsive to the first voltage falling below a second voltage at the output of the error amplifier.

18 Claims, 5 Drawing Sheets

DC-DC CONVERTER CIRCUIT

BACKGROUND

A DC-DC converter is an electronic circuit that converts an input direct current (DC) supply voltage into one or more DC output voltages that are higher or lower in magnitude than the input DC supply voltage. A DC-DC converter that generates an output voltage lower than the input voltage is termed a buck or step-down converter. A DC-DC converter that generates an output voltage higher than the input voltage is termed a boost or step-up converter. DC-DC converters are widely used to power electronic devices, particularly battery powered devices, such as portable cellular phones, laptop computers, and other electronic systems in which efficient use of power is desirable.

SUMMARY

Examples of a power supply circuit that detects and reduces transients in a DC-DC converter are described herein. In one example, a power supply circuit includes a power input, a power output, an error amplifier, a first transistor, and a second transistor. The error amplifier includes an output. The first transistor includes a first current terminal, a second current terminal, and a control terminal. The first current terminal is coupled to the power input. The control terminal is coupled to the output of the error amplifier. The second transistor includes a first current terminal, a second current terminal, and a control terminal. The first current terminal of the second transistor is coupled to the first current terminal of the first transistor. The second current terminal of the second transistor is coupled to the power output. The control terminal of the second transistor is coupled to the second current terminal of the first transistor.

In another example, a power supply circuit includes a power input, a power output, a reference input, an error amplifier, a first transistor, and a second transistor. The error amplifier includes an input and an output. The input is coupled to the reference input. The first transistor is coupled to the power input and the power output, and is configured to pass a current from the power input to the power output. The second transistor is coupled to the power input, the output of the error amplifier, and the first transistor, and is configured to provide, to the first transistor, a control voltage that follows a first voltage at the power input responsive to the first voltage falling below a second voltage at the output of the error amplifier.

In a further example, a DC-DC converter includes an inductor, a switching transistor, a driver circuit, and a power supply circuit. The switching transistor is coupled to the inductor. The driver circuit includes and output and a power input. The output is coupled to the switching transistor. The power supply circuit includes a power input, an error amplifier, a first transistor, and a second transistor. The error amplifier includes an output. The first transistor includes a first current terminal, a second current terminal, and a control terminal. The first current terminal is coupled to the power input of the power supply circuit. The control terminal is coupled to the output of the error amplifier. The second transistor includes a first current terminal, a second current terminal, and a control terminal. The first current terminal of the second transistor is coupled to the first current terminal of the first transistor. The second current terminal of the second transistor is coupled to the power input of the driver circuit. The control terminal of the second transistor is coupled to the second current terminal of the first transistor.

DETAILED DESCRIPTION

A DC-DC converter may include a power supply that generates the voltages that power the various circuits of the DC-DC converter. Switching of the DC-DC converter's output transistors my introduce transients in the input voltage provided to the power supply, and the transients may pass through to the outputs of the power supply. For example, ringing on the input voltage and/or ground provided to the power supply may cause substantial undershoot on the output voltages of the power supply. The reduction in power supply output voltage corresponding to the undershoot may affect the performance of the various circuits of the DC-DC converter powered by the power supply. For example, digital logic may malfunction, or analog circuit performance may be degraded by a reduction in power supply voltage.

Examples of the DC-DC converter and power supply circuit described herein include a source follower circuit that detects undershoot in the power supply input voltage. The source follower circuit controls the output of the power supply to prevent ringing in the power supply input voltage from passing through to the power supply output voltage and degrading DC-DC converter operation.

Figure 1:
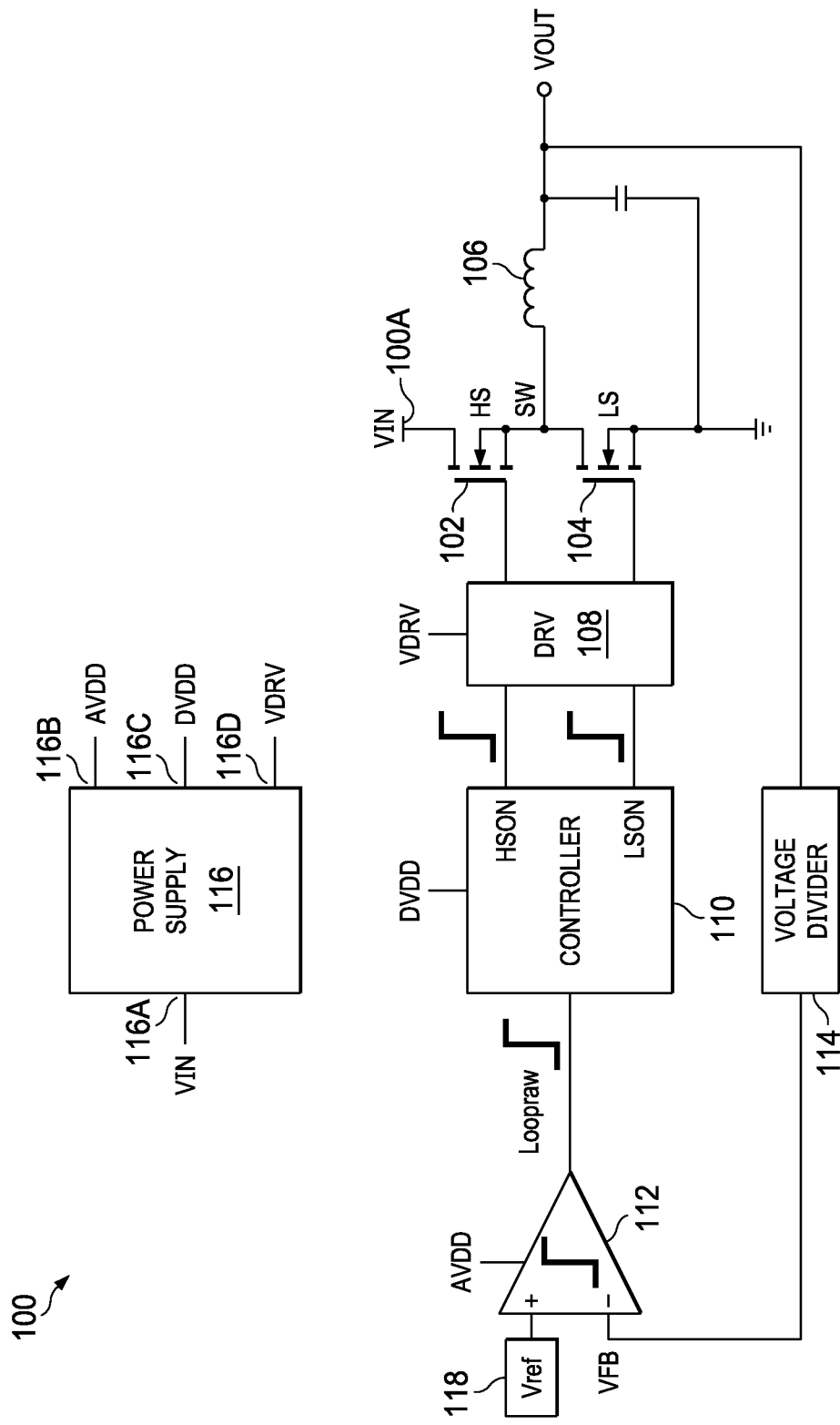
FIG. 1 is a block diagram for an example DC-DC converter that includes a power supply with undershoot protection as described herein.

FIG. 1 is a block diagram for an example DC-DC converter 100 that includes a power supply as described herein. The DC-DC converter 100 is shown as a buck converter, but various embodiments of the DC-DC converter 100 may be boost converters, buck-boost converters, or other types of DC-DC converter. The DC-DC converter 100 includes a high-side switching transistor 102, a low-side switching transistor 104, an inductor 106, a driver circuit 108, a controller 110, an error amplifier 112, a voltage divider 114, and a power supply 116. The high-side switching transistor 102 includes a current terminal (drain) coupled to an input voltage terminal 100A of the DC-DC converter 100, a control terminal (gate) coupled to the driver circuit 108, and a current terminal (source) coupled to the inductor 106. The low-side switching transistor 104 includes a current terminal (drain) coupled to the inductor 106, a control terminal (gate) coupled to the driver circuit 108, and a current terminal (source) coupled to ground.

The voltage divider 114 is coupled to the output of the DC-DC converter 100 and to an input of the error amplifier 112. The voltage divider 114 divides the output voltage (VOUT) of the DC-DC converter 100 by a predetermined divisor to provide a voltage proportional to the output voltage to the error amplifier 112. The error amplifier 112 includes an input coupled to the voltage divider 114, an input coupled to a voltage reference circuit 118, and an output coupled to the controller 110. The error amplifier 112 generates an error signal representing the difference of the feedback voltage received from the voltage divider 114, and the reference voltage received from the voltage reference circuit 118.

The controller 110 applies the error signal received from the error amplifier 112 to generate control pulses for the high-side switching transistor 102 and the low-side switching transistor 104. The controller 110 turns on the high-side switching transistor 102, and turns off the low-side switching transistor 104, to charge the inductor 106. The controller 110 turns on the low-side switching transistor 104, and turns off the high-side switching transistor 102, to discharge the inductor 106.

A high-side control output and a low-side control output of the controller 110 are coupled to the driver circuit 108. The driver circuit 108 level shifts the control pulses received from the controller 110 to voltages suitable for controlling the high-side switching transistor 102 and the low-side switching transistor 104.

The power supply 116 provides power to various circuits of the DC-DC converter 100 (e.g., the error amplifier 112, the controller 110, and the driver circuit 108). The power supply 116 includes an input 116A coupled to the input voltage terminal 100A, a power output 116D coupled to the driver circuit 108, a power output 116C coupled to the controller 110, and a power output 116B output coupled to the error amplifier 112. Switching of the high-side switching transistor 102 generates ringing on the input voltage (VIN) at the input voltage terminal 100A. If the ringing on the input voltage propagates through the power supply 116 to the driver circuit 108, the controller 110, or the error amplifier 112, then the performance of the DC-DC converter 100 may be degraded. The power supply 116 includes circuitry that detects undershoot in the input voltage and mitigates the effects of the undershoot on the outputs of the power supply 116.

Figure 2:
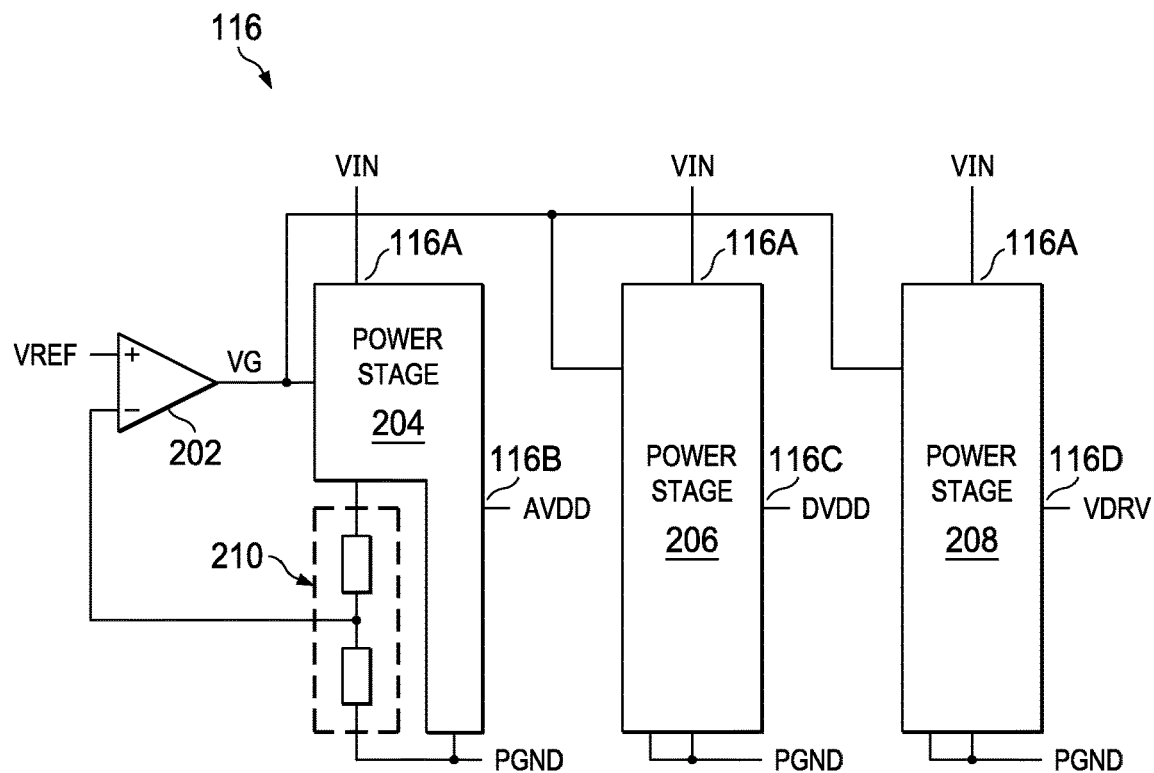
FIG. 2 shows an example power supply with undershoot protection suitable for use in the DC-DC converter of FIG. 1.

FIG. 2 shows an example of the power supply 116. The power supply 116 includes an error amplifier 202, a power stage 204, a power stage 206, a power stage 208, and a voltage divider 210. The power stage 204, the power stage 206, and the power stage 208 may be similar or identical to one another. The voltage divider 210 is coupled to the power output 116B of the power supply 116, and includes resistors that divide the output voltage of the power stage 204 by a predetermined value to produce a feedback voltage. An output of the voltage divider 210 is coupled to a first input of the error amplifier 202. A second input of the error amplifier 202 is coupled to a voltage reference (e.g., the voltage reference circuit 118) for receipt of a reference voltage (e.g., a voltage derived from output of the voltage reference circuit 118). The output of the error amplifier 202 is coupled to the power stage 204, the power stage 206, and the power stage 208 to regulate the output voltages generated by the power stage 204, the power stage 206, and the power stage 208.

Figure 3:
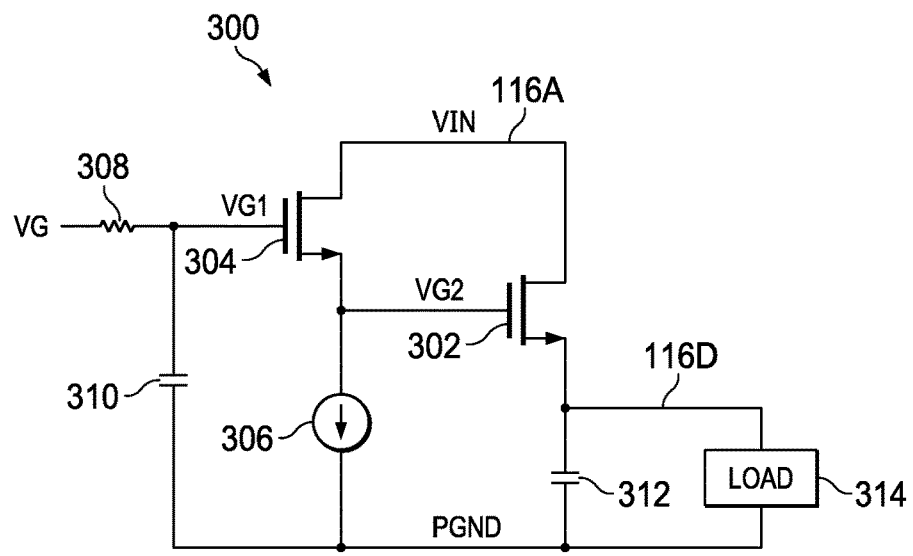
FIG. 3 shows an example power stage with undershoot protection suitable for use in the power supply of FIG. 2.

FIG. 3 shows an example power stage 300. The power stage 300 is an implementation of the power stage 204, the power stage 206, or the power stage 208. The power stage 300 includes a transistor 302, a transistor 304, a current source 306, and a capacitor 312. Some implementations of the power stage 300 include a resistor 308 and a capacitor 310. The transistor 302 and the transistor 304 may be field effect transistors (FETs). In some implementations, the transistor 302 and/or the transistor 304 may be natural threshold FETs. In some embodiments, the transistor 302 and/or the transistor 304 may standard threshold voltage NMOS FETs or low voltage threshold NMOS FETs. Standard threshold voltage NMOS FETs may have a threshold voltage of about +0.7 volts. Low threshold voltage NMOS FETs have a threshold voltage of about +0.45 volts. Natural threshold voltage NMOS FETs have a threshold voltage of about −60 millivolts. The transistor 302 is an output transistor that passes current from the input 116A to the power output 116D. A first current terminal (drain) of the transistor 302 is coupled to the input 116A. A second current terminal (source) of the transistor 302 is coupled to the power output 116D.

The transistor 304 and the current source 306 form a source follower circuit that controls the transistor 302. A first current terminal (drain) of the transistor 304 is coupled to the input 116A. A second current terminal (source) of the transistor 302 is coupled to the control terminal (gate) of the transistor 302, and to the current source 306. A control terminal (gate) of the transistor 304 is coupled to the output of the error amplifier 202. In some implementations of the power stage 300, the control terminal of the power stage 300 is coupled to the output of the error amplifier 202 via the resistor 308.

The capacitor 310 is coupled between the control terminal of the transistor 304 and ground. The capacitor 312 is coupled between the second current terminal (source) of the transistor 302 and ground.

When switching of the high-side switching transistor 102 introduces ringing onto the input voltage (VIN) at the input 116A, and the input voltage falls below the control voltage (VG1) at the control terminal of the transistor 304, the voltage (VG2) at the second current terminal (source) of the transistor 304 follows the input voltage at the input 116A. With VG2 equal to the input voltage at the input 116A, the transistor 302 is turned off, which prevents current flow from the power output 116D to the input 116A (prevents drop of the voltage at the power output 116D to VIN). Thus, the power stage 300 reduces voltage drop at the power output 116D due to transients on the input voltage provided to the power supply 116 caused by switching of the high-side switching transistor 102.

Figure 4:
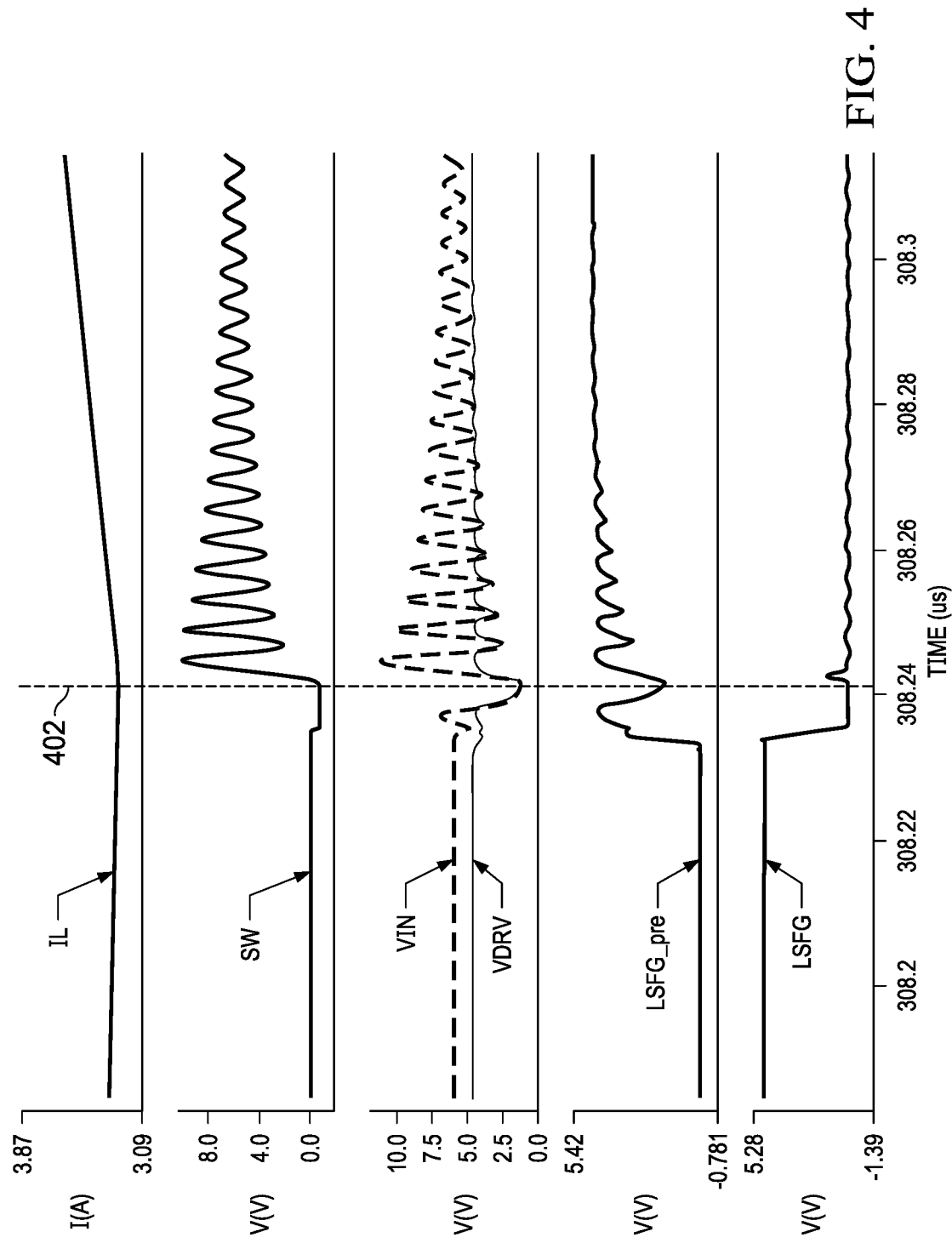
FIG. 4 shows example signals in a DC-DC converter with a power supply that lacks undershoot protection.

FIG. 4 shows example signals in a DC-DC converter with a power supply that lacks undershoot protection. FIG. 4 shows current flowing in the inductor (IL), voltage at the switching node (SW), the input voltage (VIN), and the output voltage (VDRV) of the power supply. At time 402, the high-side switching transistor of the DC-DC converter turns on, and VIN drops and rings. The output voltage of the power supply drops from about 4.7 volts to about 1.35 volts. If the output voltage of the power supply is provided to a gate driver circuit controlling the low-side switching transistor of the DC-DC converter, then, within the gate driver circuit, the drop in power supply voltage causes a drop in the signal LSFG_pre that controls the low-side switching transistor. LSFG_pre is inverted in the gate driver circuit to produce the control signal (LSFG) that drives the low-side switching transistor. With the rise in LSFG, caused by the drop in LSFG_pre, the gate driver circuit may be unable to hold the low-side switching transistor off as intended.

Figure 5:
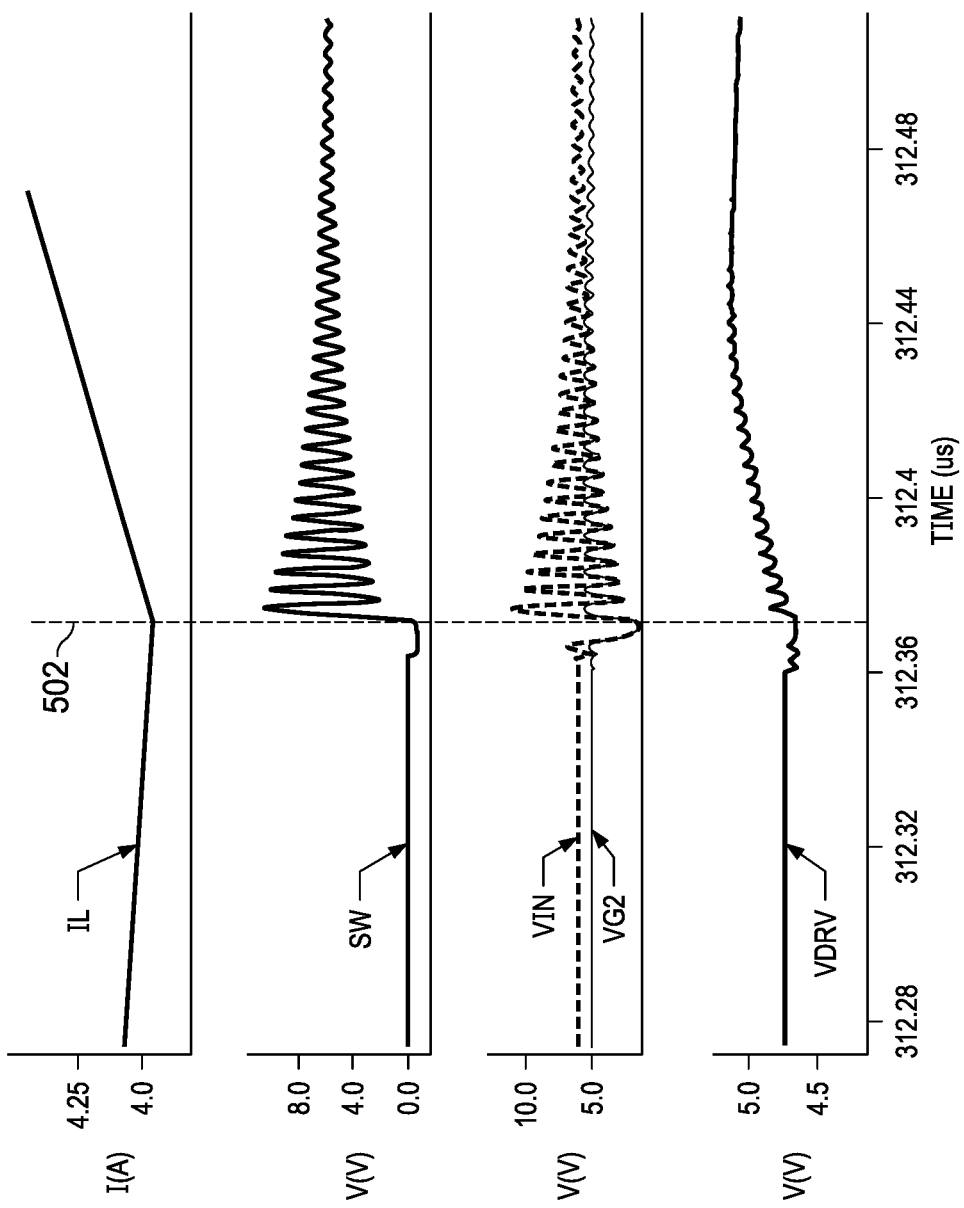
FIG. 5 shows example signals in the DC-DC converter of FIG. 1, which includes a power supply with undershoot protection.

FIG. 5 shows example signals in the DC-DC converter 100 with the power supply 116. FIG. 5 shows current (IL) flowing in the inductor 106, voltage at the switching node (SW), the input voltage (VIN), the control voltage (VG2)

applied to the transistor 302, and the output voltage (VDRV) of the power supply 116. At time 502, the high-side switching transistor 102 turns on, and VIN drops and rings. The transistor 302 detects the undershoot in VIN, and produces a control voltage VG2 that follows the undershoot of VIN. Because the gate voltage of the transistor 304 follows VIN, the transistor 304 is turned off, and no current flows from the power output 116D to the input 116A. The output voltage of the power supply 116 falls from about 4.7 volts to about 4.66 volts, rather than 1.35 volts as in FIG. 4, which enables the driver circuit 108 to properly control the low-side switching transistor 104.

Figure 6:
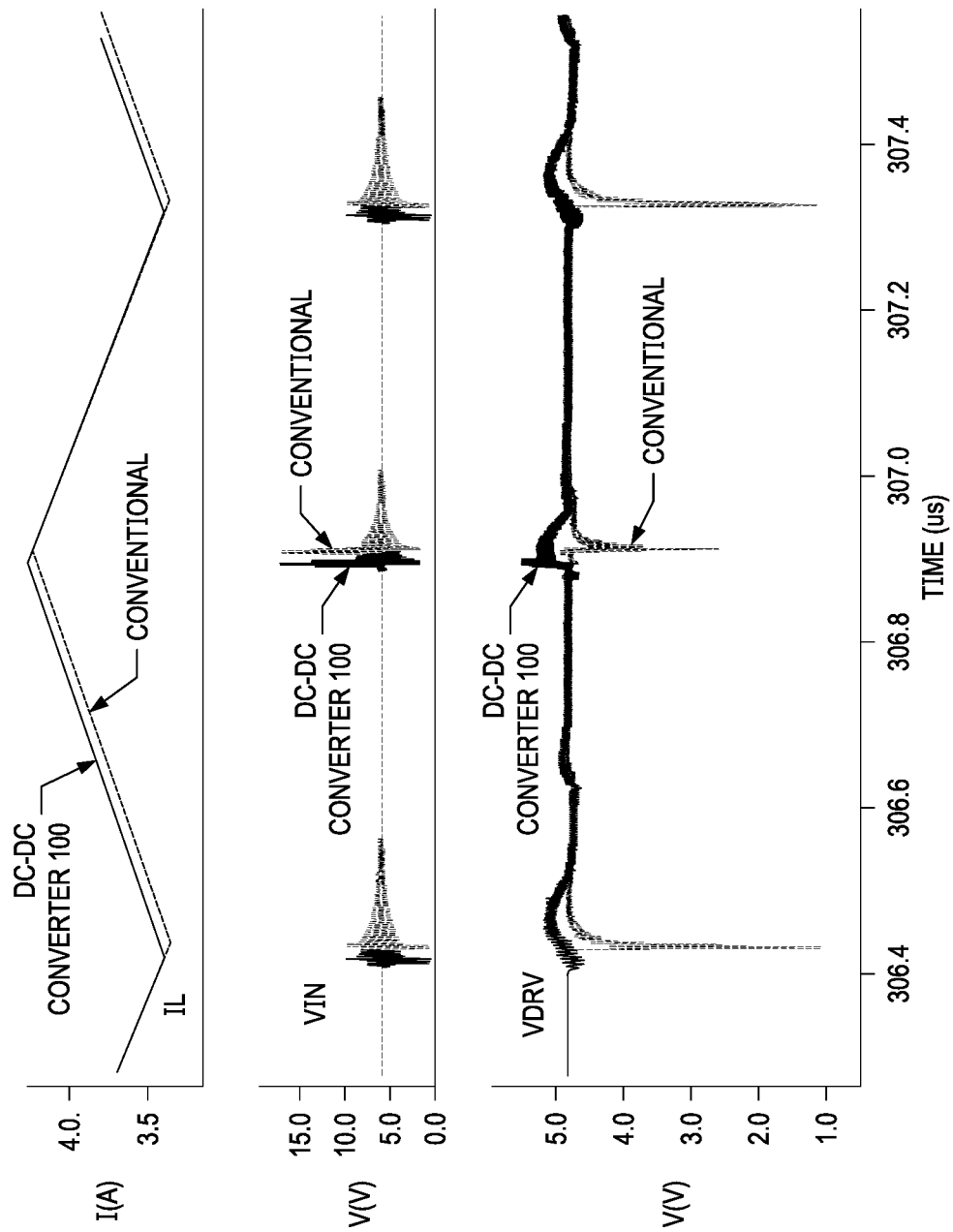
FIG. 6 is a comparison of signals in DC-DC converters having power supplies with and without undershoot protection.

FIG. 6 is a comparison of signals in DC-DC converters having power supplies with and without undershoot protection. Inductor current (IL), input voltage (VIN), and power supply output voltage (VDRV) are shown in FIG. 6. The inductor current and ringing on the input voltage are similar with and without undershoot protection. Without undershoot protection, the power supply output voltage drops from about 4.8 volts to about 1.15 volts, which may cause the DC-DC converter to malfunction. With the undershoot protection provided by the power supply 116, the power supply output voltage drop is negligible, preventing any malfunction due to a drop in the power supply output voltage.

In this description, the term "couple" or "couples" may cover connections, communications, or signal paths that enable a functional relationship consistent with this description. For example, if device A generates a signal to control device B to perform an action: (a) in a first example, device A is coupled to device B; or (b) in a second example, device A is coupled to device B through intervening component C if intervening component C does not substantially alter the functional relationship between device A and device B, such that device B is controlled by device A via the control signal generated by device A. Also, in this description, the recitation "based on" means "based at least in part on." Therefore, if X is based on Y, then X may be a function of Y and any number of other factors.

Modifications are possible in the described embodiments, and other embodiments are possible, within the scope of the claims.

What is claimed is:

1. A power supply circuit, comprising:
    a power input;
    a first power output;
    a second power output;
    an error amplifier including an output;
    a first transistor including:
        a first current terminal coupled to the power input;
        a second current terminal; and
        a control terminal coupled to the output of the error amplifier;
    a second transistor including:
        a first current terminal coupled to the first current terminal of the first transistor;
        a second current terminal coupled to the first power output; and
        a control terminal coupled to the second current terminal of the first transistor;
    a third transistor including:
        a first current terminal coupled to the power input;
        a second current terminal; and
        a control terminal coupled to the output of the error amplifier; and
    a fourth transistor including:
        a first current terminal coupled to the first current terminal of the third transistor;
        a second current terminal coupled to the second power output; and
        a control terminal coupled to the second current terminal of the third transistor.

2. The power supply circuit of claim 1, further comprising a current source coupled to the second current terminal of the first transistor.

3. The power supply circuit of claim 1, further comprising a resistor coupled between the output of the error amplifier and the control terminal of the first transistor.

4. The power supply circuit of claim 1, wherein:
    the error amplifier includes an input; and
    the power supply circuit includes a voltage divider including:
        an input coupled to the second current terminal of the fourth transistor; and
        an output coupled to the input of the error amplifier.

5. The power supply circuit of claim 1, further comprising:
    a third power output;
    a fifth transistor including:
        a first current terminal coupled to the power input;
        a second current terminal; and
        a control terminal coupled to the output of the error amplifier; and
    a sixth transistor including:
        a first current terminal coupled to the first current terminal of the fifth transistor;
        a second current terminal coupled to the third power output; and
        a control terminal coupled to the second current terminal of the fifth transistor.

6. The power supply circuit of claim 1, wherein the first transistor and the second transistor are natural threshold field effect transistors.

7. A power supply circuit, comprising:
    a power input;
    a first power output;
    a second power output;
    an error amplifier including an output;
    a first transistor coupled to the power input and the first power output, and configured to pass a current from the power input to the first power output;
    a second transistor coupled to the power input, the output of the error amplifier, and the first transistor, and configured to provide, to the first transistor, a first control voltage that follows a first voltage at the power input responsive to the first voltage falling below a second voltage at the output of the error amplifier;
    a third transistor coupled to the power input and the second power output, and configured to pass a current from the power input to the second power output; and
    a fourth transistor coupled to the power input, the output of the error amplifier, and the third transistor, and configured to provide, to the third transistor, a second control voltage that is no less than the first voltage at the power input responsive to the first voltage falling below the second voltage at the output of the error amplifier.

8. The power supply circuit of claim 7, further comprising a current source coupled to a current terminal of the second transistor and a control terminal of the first transistor.

9. The power supply circuit of claim 7, wherein the second transistor is configured as a source follower.

10. The power supply circuit of claim 7, wherein the fourth transistor is configured as a source follower.

11. The power supply circuit of claim 7, further comprising:
a third power output;
a fifth transistor coupled to the power input and the third power output, and configured to pass a current from the power input to the third power output; and
a sixth transistor coupled to the power input, the output of the error amplifier, and the fifth transistor, and configured to provide, to the fifth transistor, a third control voltage that is no less than the first voltage at the power input responsive to the first voltage falling below the second voltage at the output of the error amplifier.

12. The power supply circuit of claim 11, wherein:
the error amplifier includes an input; and
the power supply circuit includes a voltage divider coupled between the third power output and the input of the error amplifier.

13. A DC-DC converter, comprising:
an inductor;
a switching transistor coupled to the inductor;
a driver circuit including:
an output coupled to the switching transistor; and
a power input;
a power supply circuit including:
a power input;
an error amplifier including an output;
a first transistor including:
a first current terminal coupled to the power input of the power supply circuit;
a second current terminal; and
a control terminal coupled to the output of the error amplifier; and
a second transistor including:
a first current terminal coupled to the first current terminal of the first transistor;
a second current terminal coupled to the power input of the driver circuit; and
a control terminal coupled to the second current terminal of the first transistor.

14. The DC-DC converter of claim 13, further comprising:
a controller including:
a power input; and
an output coupled the driver circuit;
wherein the power supply circuit includes:
a third transistor including:
a first current terminal coupled to the power input of the power supply circuit;
a second current terminal; and
a control terminal coupled to the output of the error amplifier; and
a fourth transistor including:
a first current terminal coupled to the first current terminal of the third transistor;
a second current terminal coupled to the power input of the controller; and
a control terminal coupled to the second current terminal of the third transistor.

15. The DC-DC converter of claim 14, wherein:
the error amplifier is a first error amplifier;
the DC-DC converter includes a second error amplifier including:
a power input; and
an output coupled to the controller; and
the power supply circuit includes:
a fifth transistor including:
a first current terminal coupled to the power input of the power supply circuit;
a second current terminal; and
a control terminal coupled to the output of the error amplifier; and
a sixth transistor including:
a first current terminal coupled to the first current terminal of the fifth transistor;
a second current terminal coupled to the power input of the second error amplifier; and
a control terminal coupled to the second current terminal of the fifth transistor.

16. The DC-DC converter of claim 15, wherein:
the first error amplifier includes an input; and
the power supply circuit includes a voltage divider having an output coupled the input of the first error amplifier.

17. The DC-DC converter of claim 13, wherein the power supply circuit includes a current source coupled to the second current terminal of the first transistor.

18. The DC-DC converter of claim 13, wherein the power supply circuit includes a capacitor coupled to the second current terminal of the second transistor.

* * * * *